(12) United States Patent
Minobe (10) Patent No.: US 8,878,951 B2
(45) Date of Patent: Nov. 4, 2014

(54) IMAGE PROCESSING APPARATUS AND METHOD OF CONTROLLING THE SAME

(75) Inventor: Miyako Minobe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 223 days.

(21) Appl. No.: 13/086,918

(22) Filed: Apr. 14, 2011

(65) Prior Publication Data

US 2011/0261215 A1    Oct. 27, 2011

(30) Foreign Application Priority Data

Apr. 23, 2010 (JP) ................... 2010-100360
Jan. 19, 2011 (JP) ................... 2011-009201

(51) Int. Cl.
*H04N 5/225* (2006.01)
*H04N 5/77* (2006.01)
*H04N 9/82* (2006.01)

(52) U.S. Cl.
CPC ................... *H04N 5/772* (2013.01); *H04N 9/8205* (2013.01)
USPC ..................... 348/220.1; 348/222.1

(58) Field of Classification Search
CPC . H04N 5/772; H04N 5/23245; H04N 1/2112; H04N 2101/00; H04N 5/232
USPC .......................... 348/220.1, 222.1
See application file for complete search history.

(56) References Cited

U.S. PATENT DOCUMENTS

| 2005/0027745 A1 | 2/2005 | Sohma et al. |
| 2005/0094901 A1 | 5/2005 | Seol et al. |
| 2005/0099499 A1 | 5/2005 | Braunstein et al. |
| 2006/0103741 A1* | 5/2006 | Ogawa ..................... 348/231.99 |
| 2006/0139460 A1 | 6/2006 | Ozaki |
| 2006/0221204 A1* | 10/2006 | Ogawa ..................... 348/223.1 |

(Continued)

FOREIGN PATENT DOCUMENTS

| EP | 1102493 A1 | 5/2001 |
| EP | 1333440 A2 | 8/2003 |

(Continued)

OTHER PUBLICATIONS

The above references were cited in a European Search Report issued on Mar. 12, 2012, which is enclosed, that issued in the European Patent Application No. 11163055.4, which is a counterpart of a related U.S. Appl. No. 13/088,788.

(Continued)

*Primary Examiner* — Twyler Haskins
*Assistant Examiner* — Fayez Bhuiyan
(74) *Attorney, Agent, or Firm* — Cowan, Liebowitz & Latman, P.C.

(57) ABSTRACT

The present invention provides an image processing apparatus which records Raw moving image data constituted by a plurality of Raw image frames, the apparatus including a designation unit configured to designate a specific Raw image frame from the plurality of Raw image frames in accordance with an instruction from a user, and a control unit configured to control operation of the image processing apparatus, wherein the control unit controls the image processing apparatus to record, on a recording medium, development parameters corresponding to Raw image frames extracted from the plurality of Raw image frames at predetermined frame intervals, together with the Raw moving image data, and controls the image processing apparatus to record, on the recording medium, a development parameter corresponding to the specific Raw image frame designated by the designation unit, together with the Raw moving image data.

18 Claims, 8 Drawing Sheets

(56) References Cited

U.S. PATENT DOCUMENTS

| | | |
|---|---|---|
| 2006/0233529 A1 | 10/2006 | Moriya et al. |
| 2007/0052819 A1 | 3/2007 | Nakao et al. |
| 2008/0219654 A1* | 9/2008 | Border et al. .................... 396/89 |
| 2009/0060447 A1* | 3/2009 | Nakao ............................. 386/46 |
| 2009/0119251 A1 | 5/2009 | Ono |
| 2009/0154895 A1 | 6/2009 | Taoka |
| 2009/0290645 A1 | 11/2009 | Mabey |

FOREIGN PATENT DOCUMENTS

| | | |
|---|---|---|
| EP | 1998334 A | 12/2008 |
| JP | 2009-055335 | 3/2009 |
| JP | 2009-147745 A | 7/2009 |
| JP | 2003-259268 A | 9/2013 |

OTHER PUBLICATIONS

The above references were cited in a Aug. 9, 2011 Partial European Search Report which is not enclosed of the counterpart European Patent Application No. 11163055.4, which is a counterpart of the related U.S. Appl. No. 13/088,788.

The above reference was cited in a Mar. 31, 2014 Japanese Office Action, which is enclosed without an English Translation, that issued in Japanese Patent Application No. 2010-100361.

The above references were cited in a Dec. 26, 2013 US Office Final Action that issued in related U.S. Appl. 13/088,788, which is enclosed.

* cited by examiner

IMAGE PROCESSING APPARATUS AND METHOD OF CONTROLLING THE SAME

BACKGROUND OF THE INVENTION

1. Field of the Invention

The present invention relates to an image processing apparatus and a method of controlling the apparatus.

2. Description of the Related Art

Editing still images uses Raw development processing which can obtain images corresponding to development parameters when the user designates various development parameters for image data in Raw format obtained by recording the image signals generated by an image capturing device. Note that development parameters are pieces of information necessary to adjust an image (its image quality), for example, the contrast, exposure correction, white balance, and hue.

In addition, recently, with the popularization of digital video cameras and improvement in the performance of personal computers, it has become a general practice to edit also moving images. Under the circumstances, image data in Raw format have been handled for moving images as well as still images. That is, it is thought that digital video cameras capable of recording files in Raw format will be in widespread use.

Unlike still image data, moving image data includes the image data of many frames (image frames). In order to properly express moving image data in Raw format (Raw moving image data), it is necessary to record (add) development parameters in all the Raw image frames constituting the Raw moving image data in advance. However, in one moving image content, development parameters hardly change greatly on a frame basis especially in the same scene, and hence it is not efficient to record development parameters for all the Raw image frames constituting the moving image content.

For this reason, Japanese Patent Laid-Open No. 2009-55335 has proposed a technique of recording development parameters for only Raw image frames at predetermined intervals when recording Raw moving image data. The technique disclosed in Japanese Patent Laid-Open No. 2009-55335 generates development parameters for Raw image frames, for which no development parameters have been recorded, by performing interpolation processing using the development parameters of Raw image frames at predetermined intervals when reproducing (developing) Raw moving image data.

According to the prior art, however, since development parameters are recorded for only Raw image frames at predetermined intervals, a development parameter is not always recorded for a Raw image frame corresponding to a scene felt important by the user (to be referred to as a "scene of interest" hereinafter).

Figure 6:
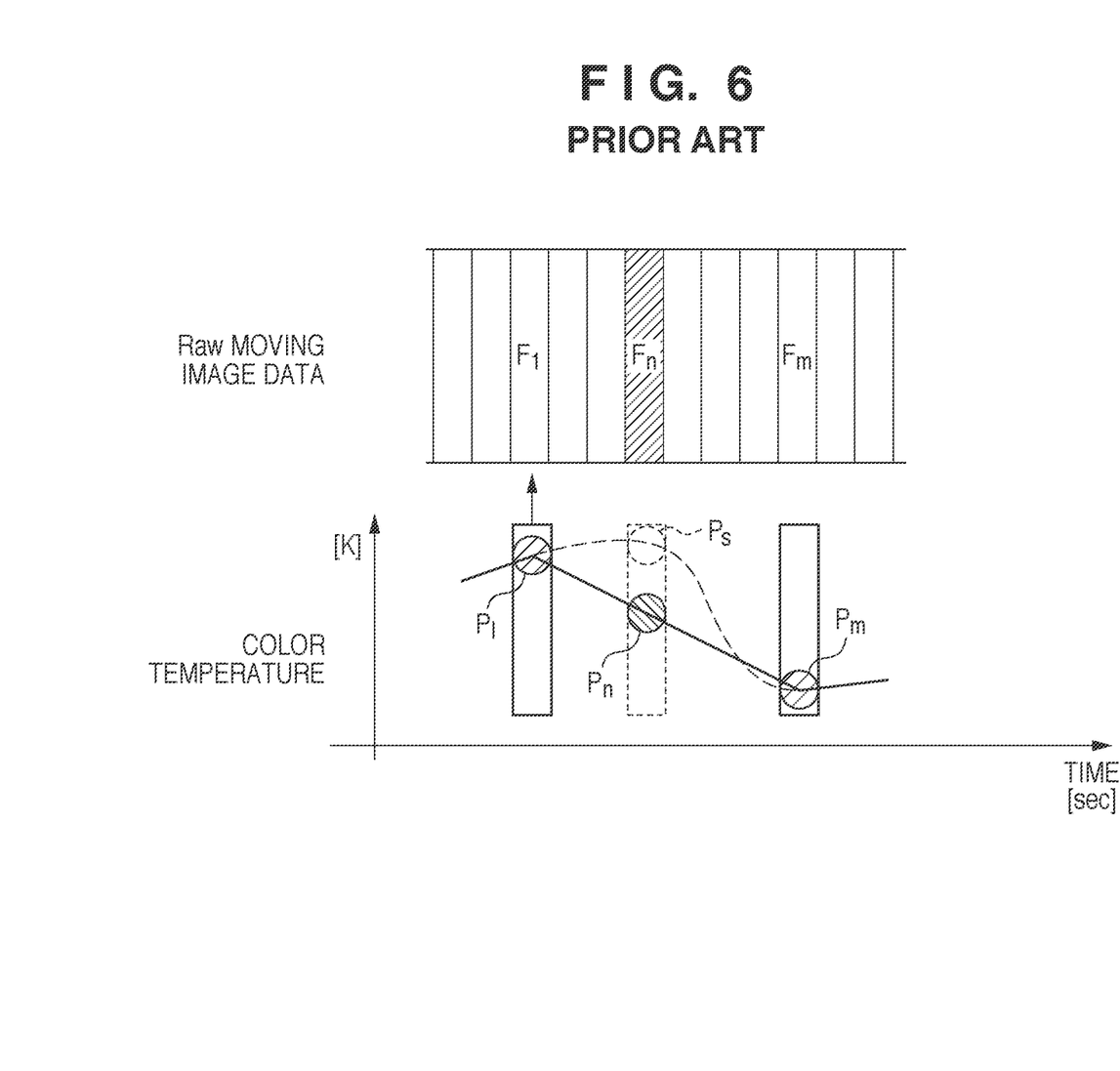
FIG. 6 is a view showing Raw moving image data recorded in the prior art.

FIG. 6 is a view showing Raw moving image data to be recorded in the prior art, in which Raw image frames constituting Raw moving image data and development parameters (color temperatures) are arranged along the time axis. An apparatus such as a digital video camera to record Raw moving image data generally performs development processing for image data to display an object on an electronic view finder (EVF). As shown in FIG. 6, therefore, the apparatus records color temperatures $P_1$ and $P_m$, as one type of development parameters, generated in development processing at the time of EVF display, respectively, for Raw image frames $F_1$ and $F_m$, appearing at predetermined intervals. Note that the apparatus has generated development parameters for all the Raw image frames constituting Raw moving image data, and has also generated a color temperature $P_s$ for a Raw image frame $F_n$ between the Raw image frames $F_1$ and $F_m$ appearing at the predetermined intervals, at the time of EVF display. In the prior art, however, since development parameters are recorded for only the Raw image frames $F_1$ and $F_m$ appearing at the predetermined intervals, the color temperature $P_s$ is not recorded for the Raw image frame $F_n$.

When reproducing Raw moving image data, the apparatus generates a color temperature $P_n$ as a color temperature for the Raw image frame $F_n$ by interpolation processing using the color temperatures $P_1$ and $P_m$. However, the color temperature $P_n$ is different from the actual color temperature $P_s$. Even if, therefore, the Raw image frame $F_n$ corresponds to a scene of interest, the Raw image frame $F_n$ is developed with the color temperature $P_n$ different from the actual color temperature $P_s$ (the color temperature assumed by the user at the time of image capturing). In order to develop the Raw image frame $F_n$ with the actual color temperature, the user needs to perform development again by adjusting the development parameter generated by interpolation processing (that is, it takes much labor and time to obtain a target image).

SUMMARY OF THE INVENTION

The present invention provides a technique with excellent user-friendliness (usability) which allows to record a development parameter for a specific Raw image frame in accordance with an instruction from a user when recording Raw moving image data.

According to one aspect of the present invention, there is provided an image processing apparatus which records Raw moving image data constituted by a plurality of Raw image frames, the apparatus comprising: a generating unit configured to generate a development parameter corresponding to a Raw image frame; a recording unit configured to record, on a recording medium, the Raw moving image data and the development parameters generated by the generating unit for Raw image frames constituting the Raw moving image data; a designation unit configured to designate a specific Raw image frame from the plurality of Raw image frames in accordance with an instruction from a user; and a control unit configured to control operation of the generating unit and operation of the recording unit, wherein the control unit controls the generating unit and the recording unit to record, on the recording medium, development parameters corresponding to Raw image frames extracted from the plurality of Raw image frames at predetermined frame intervals, together with the Raw moving image data, and controls the generating unit and the recording unit to record, on the recording medium, a development parameter corresponding to the specific Raw image frame designated by the designation unit, together with the Raw moving image data.

Further aspects of the present invention will become apparent from the following description of exemplary embodiments with reference to the attached drawings.

DESCRIPTION OF THE EMBODIMENTS

Preferred embodiments of the present invention will be described below with reference to the accompanying drawings. Note that the same reference numerals denote the same members throughout the drawings, and a repetitive description thereof will not be given.

In this embodiment, moving image data recorded in Raw format will be referred to as Raw moving image data or a Raw moving image file. In addition, image frames constituting Raw moving image data or a Raw moving image file will be referred to as Raw image frames or Raw image data.

Figure 1:
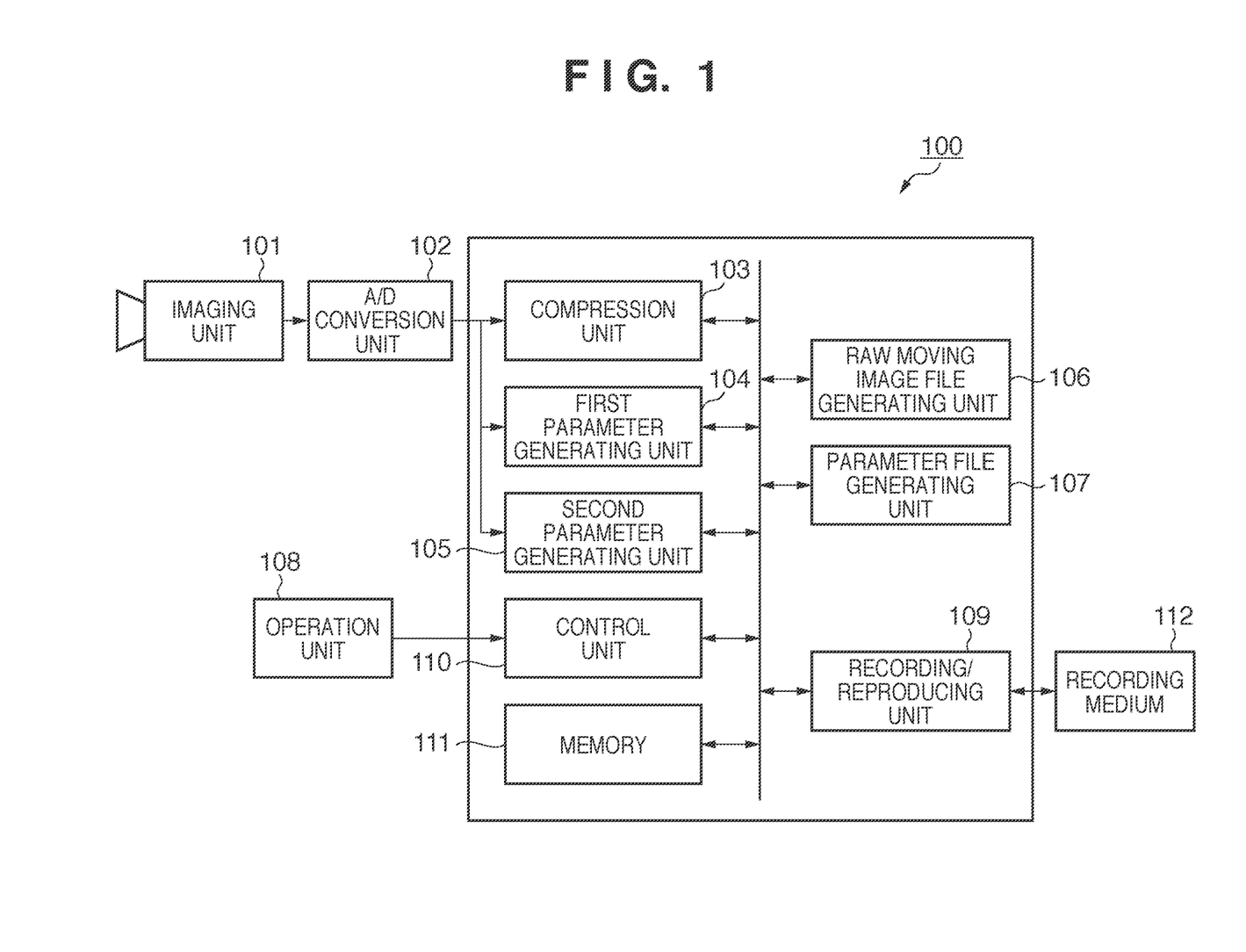
FIG. 1 is a schematic block diagram showing the arrangement of an image capturing apparatus functioning as an image processing apparatus as one aspect of the present invention.

FIG. 1 is a schematic block diagram showing the arrangement of an image capturing apparatus 100 functioning as an image processing apparatus as one aspect of the present invention. The image capturing apparatus 100 is an image capturing apparatus which selectively generates and records moving image data in Raw format (Raw moving image data) and still image data in Raw format (Raw still image data), and is embodied as a digital video camera in this embodiment. Note that Raw moving image data is image data constituted by a plurality of Raw image frames.

The image capturing apparatus 100 includes an imaging unit 101, an A/D conversion unit 102, a compression unit 103, a first parameter generating unit 104, a second parameter generating unit 105, and a Raw moving image file generating unit 106. The image capturing apparatus 100 further includes a parameter file generating unit 107, an operation unit 108, a recording/reproducing unit 109, a control unit 110, a memory 111, and a recording medium 112.

The imaging unit 101 includes an imaging optical system including an imaging lens and a focus lens which can change its focal length, a stop mechanism which can change the aperture value, and an imaging device such as a CCD or a CMOS device (photoelectric conversion device). The imaging unit 101 converts light (incident light) from an object into an electrical signal. The A/D conversion unit 102 amplifies and converts (digitally converts) electrical signals sequentially output from the imaging unit 101 on a frame basis into Raw image data.

The compression unit 103 performs lossless compression processing for the Raw image data output from the A/D conversion unit 102. This can reduce the data amount of Raw image data. In addition, it is possible to record Raw moving image data without any deterioration in image quality and the like.

The first parameter generating unit 104 generates a development parameter (a development parameters for a moving image), for each frame, which is required to reproduce (develop) Raw moving image data, based on the Raw image data output from the A/D conversion unit 102. In other words, the first parameter generating unit 104 generates development parameters respectively corresponding to a plurality of Raw image frames constituting Raw moving image data. Note that when generating a development parameter for a given Raw image frame, the first parameter generating unit 104 generates a development parameter which suppresses an abrupt change within a short period in consideration of Raw image frames temporally preceding the given Raw image frame. More specifically, development parameters include pieces of information for adjusting an image (its image quality) such as a contrast, exposure, white balance, and hue.

The second parameter generating unit 105 generates development parameters (development parameters for a still image) required to reproduce (develop) Raw still image data based on the Raw image data output from the A/D conversion unit 102. Note that the second parameter generating unit 105 generates development parameters based on only the Raw image frames generated when the user has issued an instruction to generate Raw still image data.

The Raw moving image file generating unit 106 generates a Raw moving image file based on the Raw image data output from the compression unit 103 on a frame basis. The Raw moving image file generated by the Raw moving image file generating unit 106 is recorded on the recording medium 112 via the recording/reproducing unit 109.

The parameter file generating unit 107 generates a development parameter file based on the development parameters output from the first and second parameter generating units 104 and 105. Note that development parameters constituting the development parameter file generated by the parameter file generating unit 107 are respectively associated with Raw image frames corresponding to the Raw image data output from the compression unit 103.

The operation unit 108 is constituted by various buttons for accepting user's operation (inputting an operation instruction) and the like. For example, the operation unit 108 includes a moving image capturing start/end button, a still image capturing button, and buttons for making various settings for the image capturing apparatus 100. The user can issue an instruction to generate Raw moving image data or stop generating Raw moving image data by operating the moving image capturing start/end button. In this embodiment, the still image capturing button allows half-pressing operation and full-pressing operation. The user can issue an instruction (preparation instruction) to prepare for the generation of Raw still image data by half-pressing the still image capturing button, and can issue an instruction to generate Raw still image data by full-pressing the still image capturing button. In this case, preparation for the generation of Raw still image data includes determining or changing imaging conditions at the time of the generation of Raw still image data. Note that the imaging conditions include a focal length set for the focus lens of the imaging unit 101, an aperture value and ISO speed set for the stop mechanism, and the amplification factor of an electrical signal set for the A/D conversion unit 102.

The recording/reproducing unit 109 writes image data in the recording medium 112, or reads out image data recorded on the recording medium 112. In this embodiment, the recording/reproducing unit 109 has a function of recording Raw moving image data and development parameters corresponding to the Raw image frames constituting the Raw moving image data on the recording medium 112, as will be described later.

The control unit 110 includes a CPU and controls the overall operation of the image capturing apparatus 100. The control unit 110 controls the respective units of the image capturing apparatus 100 to record, on the recording medium 112, a development parameter corresponding to a specific Raw image frame designated in accordance with an instruction from the user, together with the Raw moving image data.

The control unit 110 also controls the respective units of the image capturing apparatus 100 to record, on the recording medium 112, development parameters corresponding to Raw image frames extracted from a plurality of Raw image frames at predetermined frame intervals together with the Raw moving image data. Note that the predetermined frame intervals are determined in advance by default or user setting (for example, 15-frame intervals).

The memory 111 is formed by a semiconductor storage device such as an SDRAM (Synchronous Dynamic Random Access Memory), and temporarily stores data output from each unit of the image capturing apparatus 100.

Figure 2:
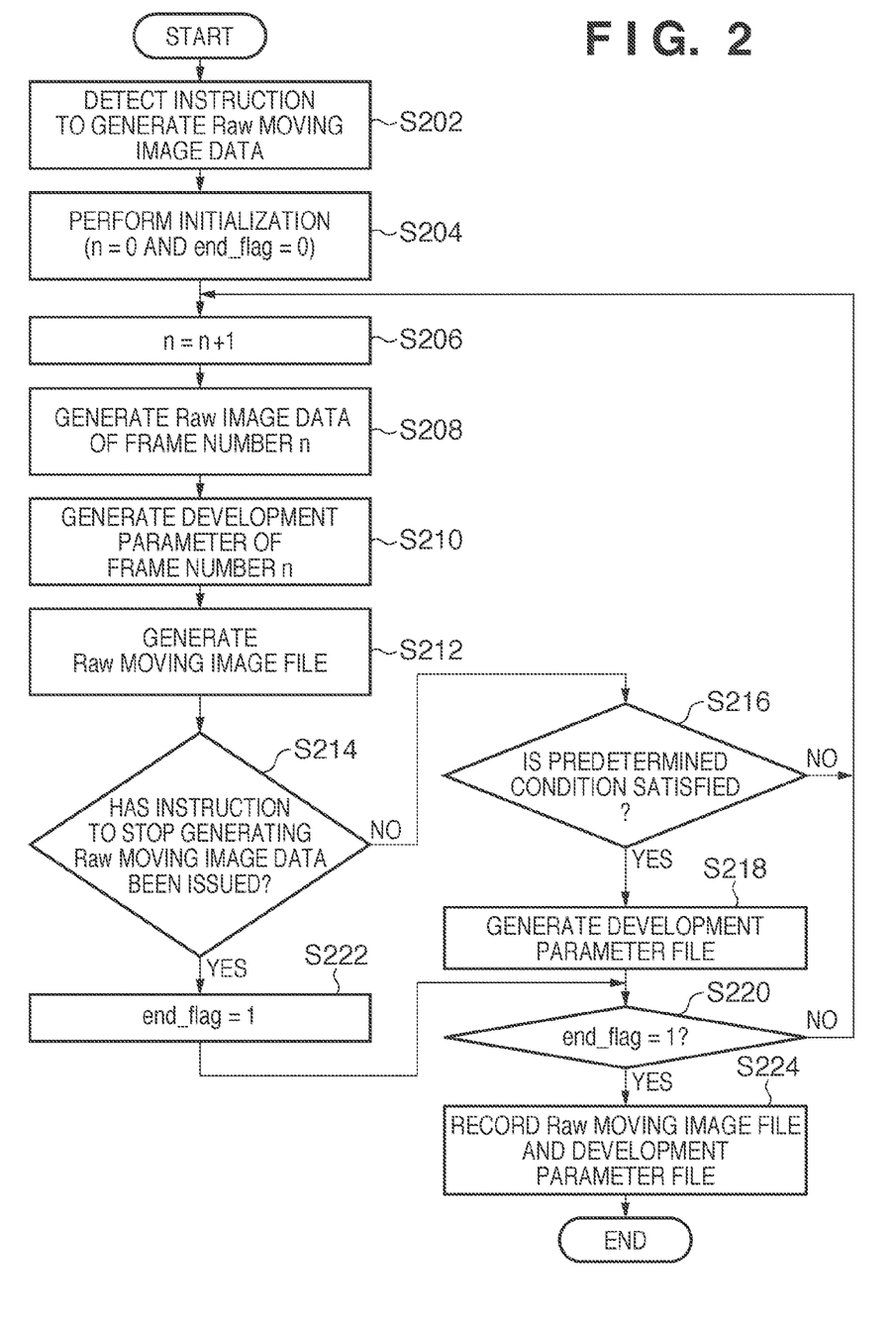
FIG. 2 is a flowchart for explaining the operation of the image capturing apparatus shown in FIG. 1.
Figure 3:
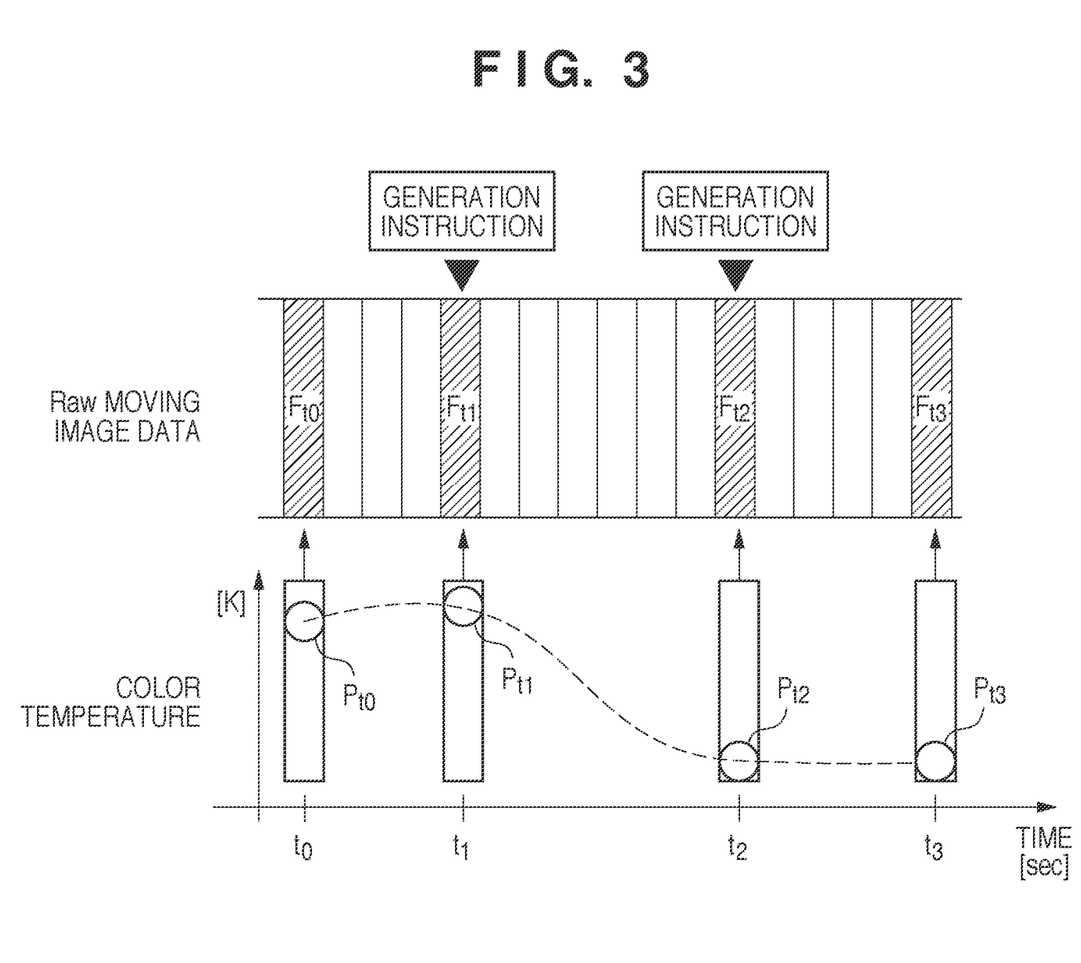
FIG. 3 is a view showing Raw moving image data recorded in the image capturing apparatus shown in FIG. 1.

The operation of the image capturing apparatus 100, more specifically, the operation of recording Raw moving image data constituted by a plurality of Raw image frames on the recording medium 112 will be described with reference to FIGS. 2 and 3. The control unit 110 comprehensively controls the respective units of the image capturing apparatus 100 to execute this operation. FIG. 2 is a flowchart for explaining the operation of the image capturing apparatus 100. FIG. 3 is a view showing Raw moving image data to be recorded in the image capturing apparatus 100, in which Raw image frames constituting Raw moving image data and development parameters (color temperatures in this embodiment) are arranged along the time axis.

In step S202, the control unit 110 detects that the user has issued an instruction to generate Raw moving image data (that is, has input a generation instruction to generate Raw moving image data) via the moving image capturing start/end button of the operation unit 108. This causes the image capturing apparatus 100 to start capturing a moving image.

In step S204, the control unit 110 initializes flags, variables, and the like associated with the capturing of a moving image. More specifically, the control unit 110 initializes a frame number n (n=0) in a series of processing repeatedly performed for each frame. The control unit 110 also initializes a moving image capturing end flag end_flag for storing information indicating that the user has issued an instruction to stop generating Raw moving image data (that is, has operated the moving image capturing start/end button) (end_flag=0).

In step S206, the control unit 110 increments the frame number n by +1 (n=n+1). For example, the frame number n is set to 1 for a frame from which the capturing of a moving image has started.

In step S208, the imaging unit 101 and the A/D conversion unit 102 generate Raw image data (Raw image frame) of the frame number n under the control of the control unit 110.

In step S210, under the control of the control unit 110, the first parameter generating unit 104 generates a development parameter based on the Raw image data of the frame number n generated in step S208 (that is, a development parameter for the Raw image data of the frame number n).

In step S212, the Raw moving image file generating unit 106 generates a Raw moving image file by recording (writing) the Raw image data of the frame number n generated in step S208 in a file under the control of the control unit 110. Note that in generating a Raw moving image file, it is possible to record Raw image data in a file for each frame, as shown in FIG. 2, or to buffer Raw image data in the memory 111 and record the data in a file at predetermined time intervals.

In step S214, the control unit 110 determines whether the user has issued an instruction to stop generating Raw moving image data via the moving image capturing start/end button of the operation unit 108 (that is, has operated the moving image capturing start/end button). If the user has not issued any instruction to stop generating Raw moving image data, that is, the capturing of a moving image continues, the process shifts to step S216.

In step S216, the control unit 110 determines whether the Raw image data of the frame number n satisfies a predetermined condition, that is, the Raw image frame of the frame number n is one of Raw image frames appearing at predetermined frame intervals. If the Raw image data of the frame number n does not satisfy the predetermined condition, the process shifts to step S206 without recording any development parameter. If the Raw image data of the frame number n satisfies the predetermined condition, the process shifts to step S218 to record the development parameter.

In step S218, under the control of the control unit 110, the parameter file generating unit 107 generates a development parameter file by recording (writing) the development parameter for the Raw image frame of the frame number n generated in step S210 in a file. Note that in generating a development parameter file, it is possible to record development parameters in a file for each frame, as shown in FIG. 2, or to buffer development parameters in the memory 111 and record them in a file at predetermined time intervals.

In step S220, the control unit 110 determines whether the moving image capturing end flag end_flag is 1 (end_flag=1). If the moving image capturing end flag end_flag is not 1, the process shifts to step S206. If the moving image capturing end flag end_flag is 1, the process shifts to step S224.

This apparatus executes the processing in steps S206 to S220 on a frame basis while the capturing of a moving image continues (that is, until the user issues an instruction to stop generating Raw moving image data).

If the control unit 110 determined in step S214 that the user has issued an instruction to stop generating Raw moving image data, the process shifts to step S222. In step S222, the control unit 110 sets the moving image capturing end flag end_flag to 1 (end_flag=1), and the process shifts to step S220. In this case, the control unit 110 causes the imaging unit 101 and the A/D conversion unit 102 to stop generating Raw moving image data.

In step S224, the recording/reproducing unit 109 records the Raw moving image file generated in step S212 and the development parameter file generated in step S218 on the recording medium 112 under the control of the control unit 110.

The following is a detailed description of a case in which during capturing of a moving image, that is, generation of Raw moving image data, the user has issued a generation instruction to generate Raw still image data (that is, the user has full-pressed the still image capturing button of the operation unit 108). For example, as shown in FIG. 3, the control unit 110 detects that the user has issued the generation instructions at times $t_1$ and $t_2$, and designates one Raw image frame $F_{t1}$ generated at time $t_1$ and one Raw image frame $F_{t2}$ generated at time $t_2$ as specific Raw image frames. The control unit 110 controls the respective units of the image capturing apparatus 100 to record, on the recording medium 112, color temperatures $P_{t1}$ and $P_{t2}$ respectively corresponding to the Raw image frames $F_{t1}$ and $F_{t2}$, together with Raw moving image data. More specifically, the first parameter generating unit 104 outputs the color temperatures $P_{t1}$ and $P_{t2}$ corresponding to the Raw image frames $F_{t1}$ and $F_{t2}$ to the parameter file generating unit 107 under the control of the control unit 110. The parameter file generating unit 107 generates a development parameter file based on the color temperatures $P_{t1}$ and $P_{t2}$ output from the first parameter generating unit 104, and outputs the file to the recording/reproducing unit 109. The recording/reproducing unit 109 records, on the recording medium 112, the development parameter file output from the parameter file generating unit 107, together with the Raw moving image file output from the Raw moving image file generating unit 106.

In this manner, the recording/reproducing unit 109 records, on the recording medium 112, the color temperatures $P_{t1}$ and $P_{t2}$ respectively corresponding to the Raw image frames $F_{t1}$ and $F_{t2}$ designated as the specific Raw image frames in accordance with the generation instruction from the user, together with the Raw moving image data. Note that the recording/reproducing unit 109 records, on the recording medium 112, color temperatures $P_{t0}$ and $P_{t3}$ respectively corresponding to Raw image frames $F_{t0}$ and $F_{t3}$ appearing at the predetermined frame intervals, together with the Raw moving image data.

Note that during the generation of Raw moving image data, the control unit 110 detects whether the user has issued a generation instruction to generate Raw still image data (the user has full-pressed the still image capturing button). The control unit 110 continues control to designate the Raw image frame generated at the time of issuance of the generation instruction as a specific Raw image frame and record a development parameter corresponding to the specific Raw image frame on the recording medium 112.

Referring to FIG. 3, a development parameter is recorded for the specific Raw image frame, in the Raw moving image data recorded in the image capturing apparatus 100, which is designated in accordance with an instruction (generation instruction) from the user. In other words, when the user full-presses the still image capturing button at a scene (scene of interest) which the user feels important, the image capturing apparatus 100 can record (add) an actual development parameter for a Raw image frame corresponding to the scene of interest. When, therefore, reproducing Raw moving image data, the apparatus can develop the Raw image frame corresponding to the scene of interest with the actual development parameter, it is possible to obtain a target image without adjusting the development parameter. In this manner, the image capturing apparatus 100 can improve user-friendliness (usability).

It is possible to generate development parameters for Raw image frames for which no development parameter has been recorded (Raw image frames other than specific Raw image frames) by interpolation processing using the development parameters corresponding to the specific Raw image frames. This embodiment records development parameters corresponding to specific Raw image frames designated in accordance with instructions (generation instructions) from the user as well as recording, on the recording medium 112, development parameters corresponding to Raw image frames extracted at predetermined frame intervals. This can further improve the accuracy of interpolation processing.

Figure 4:
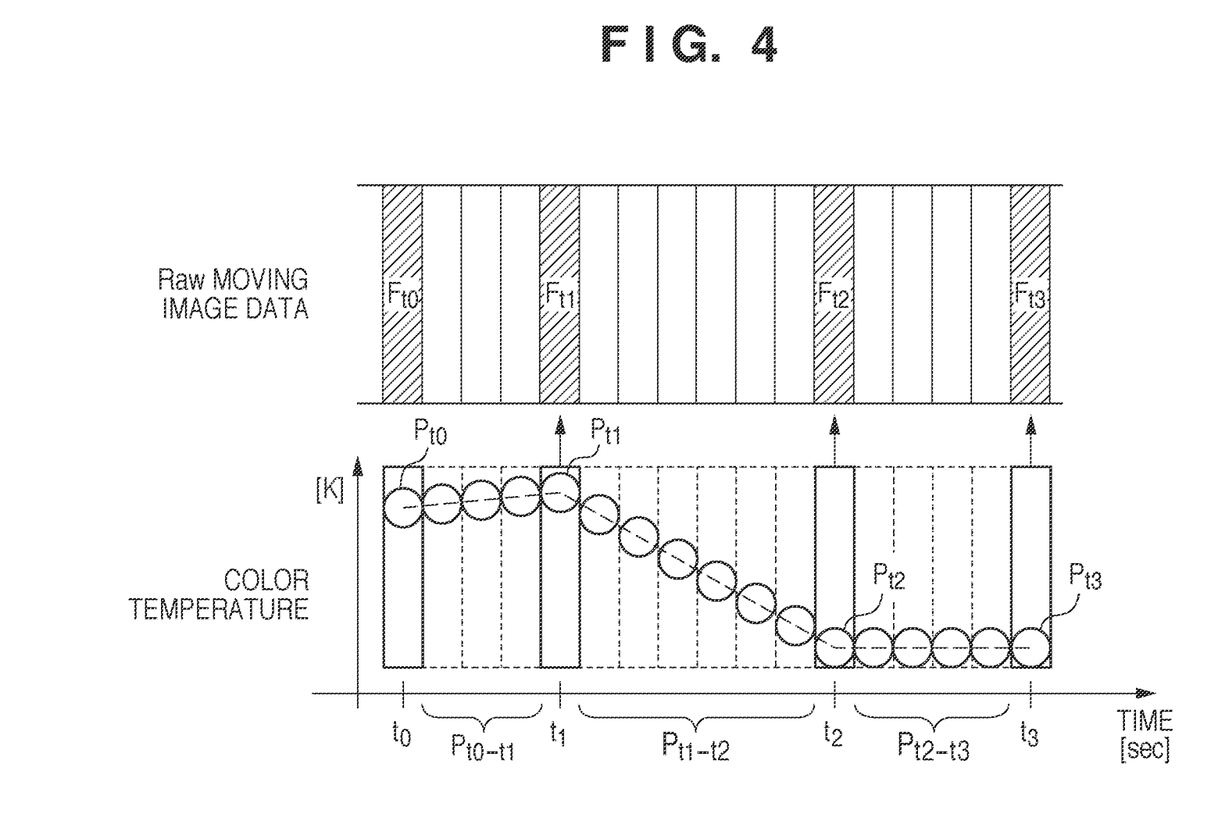
FIG. 4 is a view for explaining interpolation processing performed when reproducing (developing) the Raw moving image data shown in FIG. 2.

A case in which the recording/reproducing unit 109 reproduces (develops) Raw moving image data recorded in the image capturing apparatus 100 of this embodiment will be described with reference to FIG. 4. Note, however, that the user may insert a memory card or the like to which Raw moving image data and a development parameter file are copied into an external reproducing apparatus to reproduce (develop) the Raw moving image data. When reproducing Raw moving image data, it is necessary to generate proper development parameters for Raw image frames for which no development parameter has been recorded, by performing interpolation processing using development parameters recorded for the Raw moving image data. Note that FIG. 4 shows interpolation processing for the reproduction of the Raw moving image data shown in FIG. 3. Referring to FIG. 4, Raw image frames constituting Raw moving image data and development parameters (color temperatures in this embodiment) are arranged along the time axis.

Referring to FIG. 4, the color temperatures $P_{t0}$, $P_{t1}$, $P_{t2}$, and $P_{t3}$, indicated by the solid lines, respectively corresponding to the Raw image frames $F_{t0}$, $F_{t1}$, $F_{t2}$ and $F_{t3}$ are recorded in the Raw moving image data, as described above. In addition, color temperatures $P_{t0-t1}$, $P_{t1-t2}$, and $P_{t2-t3}$, indicated by the broken lines, corresponding to Raw image frames are generated by interpolation processing. More specifically, the apparatus generates the proper color temperature $P_{t0-t1}$ for the Raw image frames existing between the Raw image frame $F_{t0}$ and the Raw image frame $F_{t1}$ by interpolation processing using the color temperatures $P_{t0}$ and $P_{t1}$. The apparatus also generates the proper color temperature $P_{t1-t2}$ for the Raw image frames existing between the Raw image frame $F_{t1}$ and the Raw image frame $F_{t2}$ by interpolation processing using the color temperatures $P_{t1}$ and $P_{t2}$. In addition, the apparatus generates the proper development parameter $P_{t2-t3}$ for the Raw image frames existing between the Raw image frame $F_{t2}$ and the Raw image frame $F_{t3}$ by interpolation processing using the development parameters $P_{t2}$ and $P_{t3}$.

The image capturing apparatus 100 also records the development parameters output from the second parameter generating unit 105 on the recording medium 112 when the user issues a generation instruction to generate Raw still image data, regardless of whether a moving image is being captured. More specifically, the Raw still image data output from the compression unit 103 and the development parameters output from the second parameter generating unit 105 are recorded on the recording medium 112 in association with each other under the control of the control unit 110.

Figure 5:
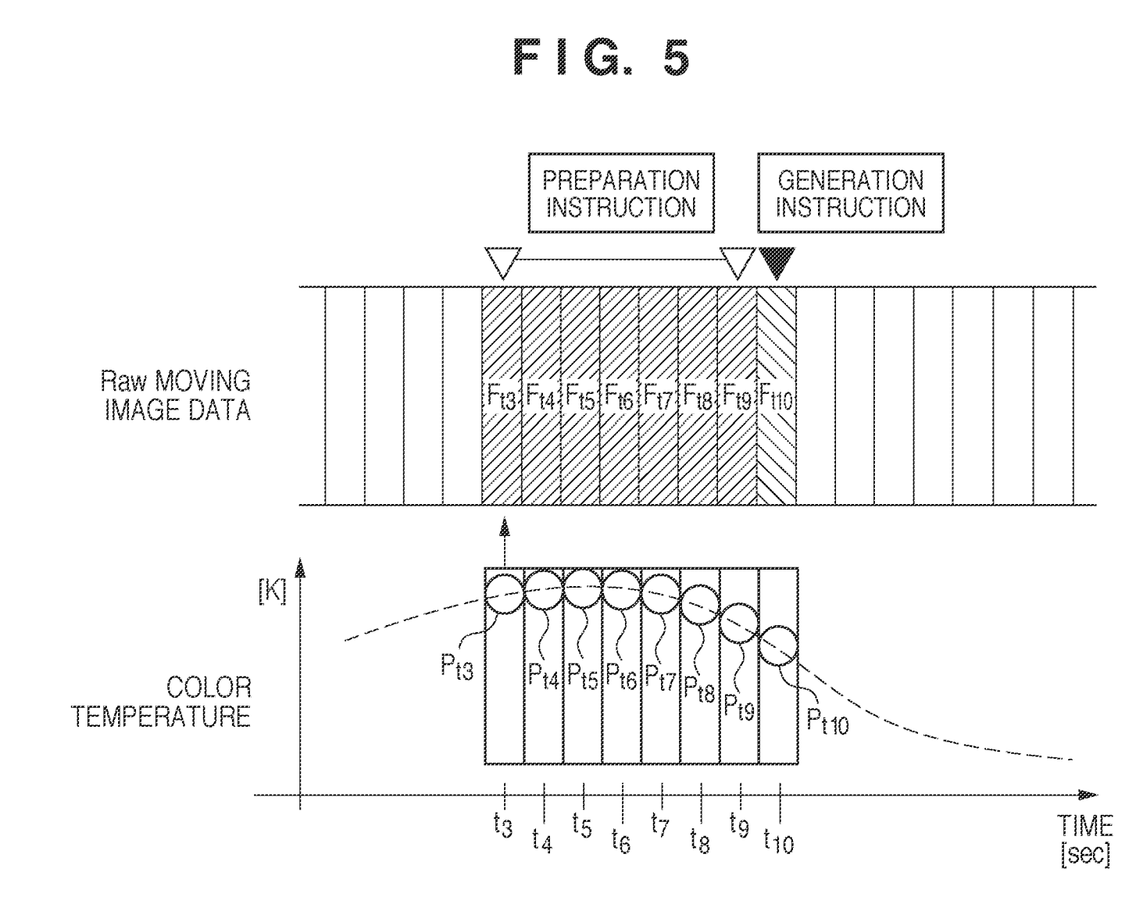
FIG. 5 is a view showing Raw moving image data recorded in the image capturing apparatus shown FIG. 1.

In addition, as shown in FIG. 5, it is possible to designate, as specific Raw image frames, consecutive Raw image frames generated while the user issues a preparation instruction to prepare for the generation of Raw still image data during the generation of Raw moving image data. FIG. 5 is a view showing Raw moving image data to be recorded in the image capturing apparatus 100, in which Raw image frames constituting Raw moving image data and development parameters (color temperatures in this embodiment) are arranged along the time axis. Note that the time during which the user issues the preparation instruction corresponds to the time during which the user half-presses the still image capturing button of the operation unit 108.

Referring to FIG. 5, the control unit 110 detects that a preparation instruction has been issued in the interval between time $t_3$ and time $t_9$, and designates consecutive Raw image frames $F_{t3}$ to $F_{t9}$ generated between time $t_3$ and time $t_9$ as specific Raw image frames. In addition, the control unit 110 detects that a generation instruction has been issued at time $t_{10}$, and designates a Raw image frame $F_{10}$ generated at time $t_{10}$ as a specific Raw image frame. The control unit 110 then controls the respective units of the image capturing apparatus 100 to record, on the recording medium 112, the color temperatures $P_{t3}$ to $P_{t10}$ respectively corresponding to the Raw image frames $F_{t3}$ to $F_{t10}$, together with the Raw moving image data. More specifically, the first parameter generating unit 104 outputs the color temperatures $P_{t3}$ to $P_{t10}$ respectively corresponding to the Raw image frames $F_{t3}$ to $F_{t10}$ to the parameter file generating unit 107 under the control of the control unit 110. The parameter file generating unit 107 generates a development parameter file based on the color temperatures $P_{t3}$ to $P_{t10}$ output from the first parameter generating unit 104 and outputs the file to the recording/reproducing unit 109. The recording/reproducing unit 109 records, on the recording medium 112, the development parameter file output from the parameter file generating unit 107, together with the Raw moving image file output from the Raw moving image file generating unit 106.

In this manner, the recording/reproducing unit 109 records, on the recording medium 112, the color temperatures $P_{t1}$ to $P_{t10}$ respectively corresponding to the Raw image frames $F_{t1}$ to $F_{t10}$ designated as the specific Raw image frames in accordance with the preparation and generation instructions from the user, together with the Raw moving image data.

As shown in FIG. 5, when the user half-presses the still image capturing button at a scene of interest, the imaging apparatus 100 can record (add) actual development parameters for temporally consecutive Raw image frames including a Raw image frame corresponding to the scene of interest. When, therefore, reproducing the Raw moving image data, the apparatus can develop the Raw image frames corresponding to the scene of interest and adjacent scenes by using the actual development parameters, and hence can obtain a target image without adjusting the development parameters.

Note that this embodiment designates specific Raw image frames in accordance with half-pressing operation or full-pressing operation of the still image capturing button. This is because when a scene of interest appears, the user is likely to capture a still image of the scene of interest (that is, operate the still image capturing button). Therefore, a dedicated button for designating specific Raw image frames may be provided for the imaging apparatus 100 to designate specific Raw image frames in accordance with the operation of the dedicated button.

Figure 7:
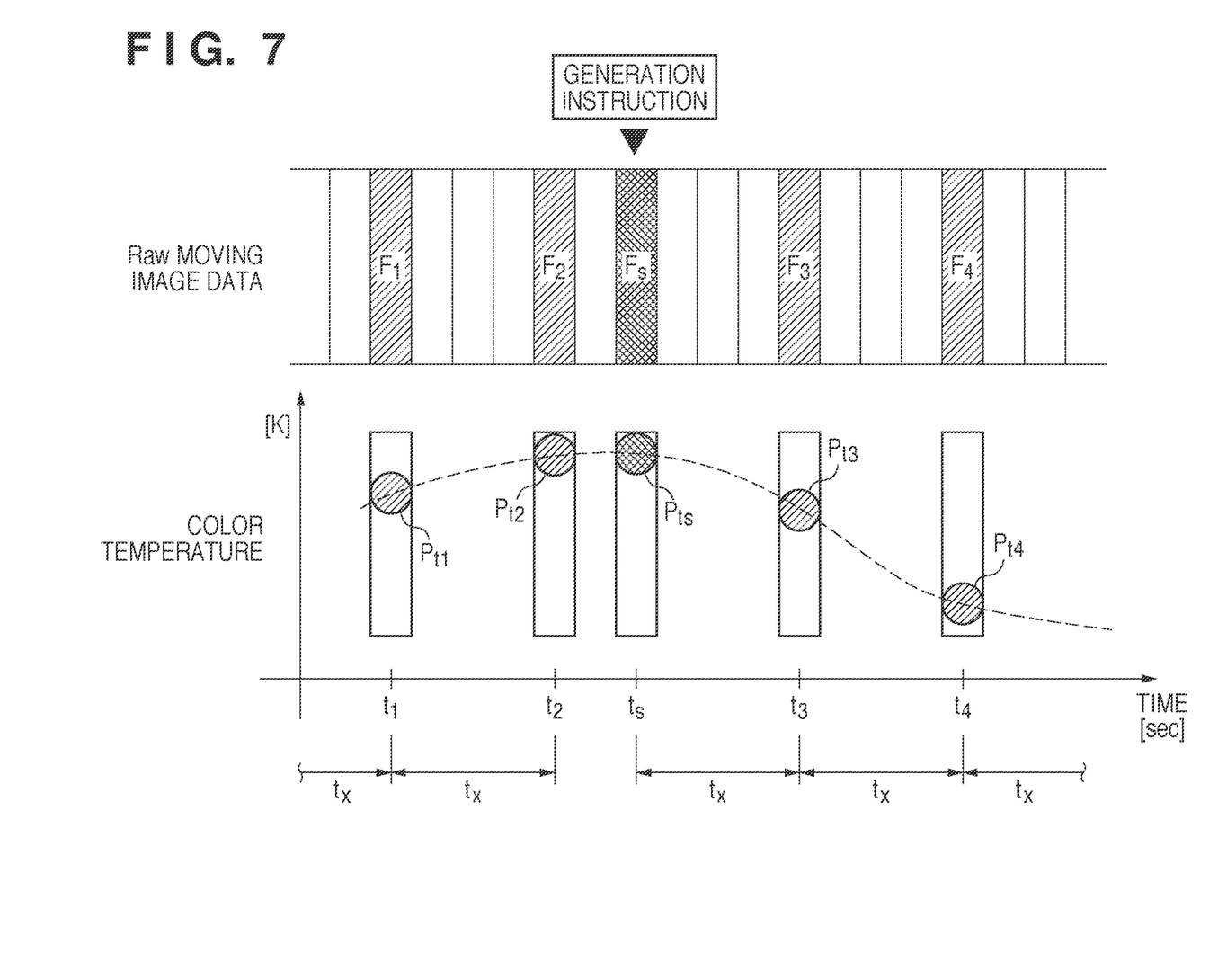
FIG. 7 is a view showing Raw moving image data recorded in the image capturing apparatus shown in FIG. 1.

In addition, as shown in FIG. 7, when development parameters are periodically recorded for Raw image frames appearing at predetermined frame intervals (3-frame intervals), it is possible to shift the timing of recording a development parameter in accordance with an instruction (generation instruction) from the user. FIG. 7 is a view showing Raw moving image data to be recorded in the image capturing apparatus 100, in which Raw image frames constituting Raw moving image data and development parameters (color temperatures in this embodiment) are arranged along the time axis. As described above, the image capturing apparatus 100 automatically records, on the recording medium 112, the color temperatures $P_{t0}$ to $P_{t4}$ respectively corresponding to the Raw image frames $F_1$ to $F_4$, together with the Raw moving image data.

As shown in FIG. 7, when the user full-presses the still image capturing button at time $t_3$ corresponding to a scene of interest after the color temperature $P_{t2}$ is automatically recorded, the image capturing apparatus 100 records (adds) a color temperature $P_{ts}$ for a Raw image frame $F_s$. Referring to FIG. 7, the control unit 110 detects that the user has issued a generation instruction at time $t_s$, and designates one Raw image frame $F_s$ generated at time $t_s$ as a specific Raw image frame. The control unit 110 then controls the respective units of the image capturing apparatus 100 to record the color temperature $P_{ts}$ corresponding to the Raw image frame $F_s$ on the recording medium 112, together with Raw moving image data. More specifically, the first parameter generating unit 104 outputs the color temperature $P_{ts}$ corresponding to the Raw image frame $F_s$ to the parameter file generating unit 107 under the control of the control unit 110. The parameter file generating unit 107 generates a development parameter file based on the color temperature $P_{ts}$ output from the first parameter generating unit 104, and outputs the file to the recording/reproducing unit 109. The recording/reproducing unit 109 records, on the recording medium 112, the development parameter file output from the parameter file generating unit 107, together with the Raw moving image file output from the Raw moving image file generating unit 106. The image capturing apparatus 100 then records the color temperature $P_{t3}$ for the Raw image frame $F_3$ (the Raw image frame three frames after the Raw image frame $F_s$) generated when a predetermined time $t_x$ has elapsed from time $t_s$ at which the user issued the generation instruction. Note that after recording the color temperature $P_{t3}$ for the Raw image frame $F_3$, the apparatus continues recording color temperatures (for example, the color temperature $P_{t4}$) for Raw image frames (for example, the Raw image frame $F_4$) appearing at predetermined frame intervals (3-frame intervals).

In this manner, when development parameters are periodically recorded, the image capturing apparatus 100 can record a development parameter at a proper timing corresponding to an instruction (generation instruction) from the user without increasing the number of development parameters to be recorded.

Figure 8:
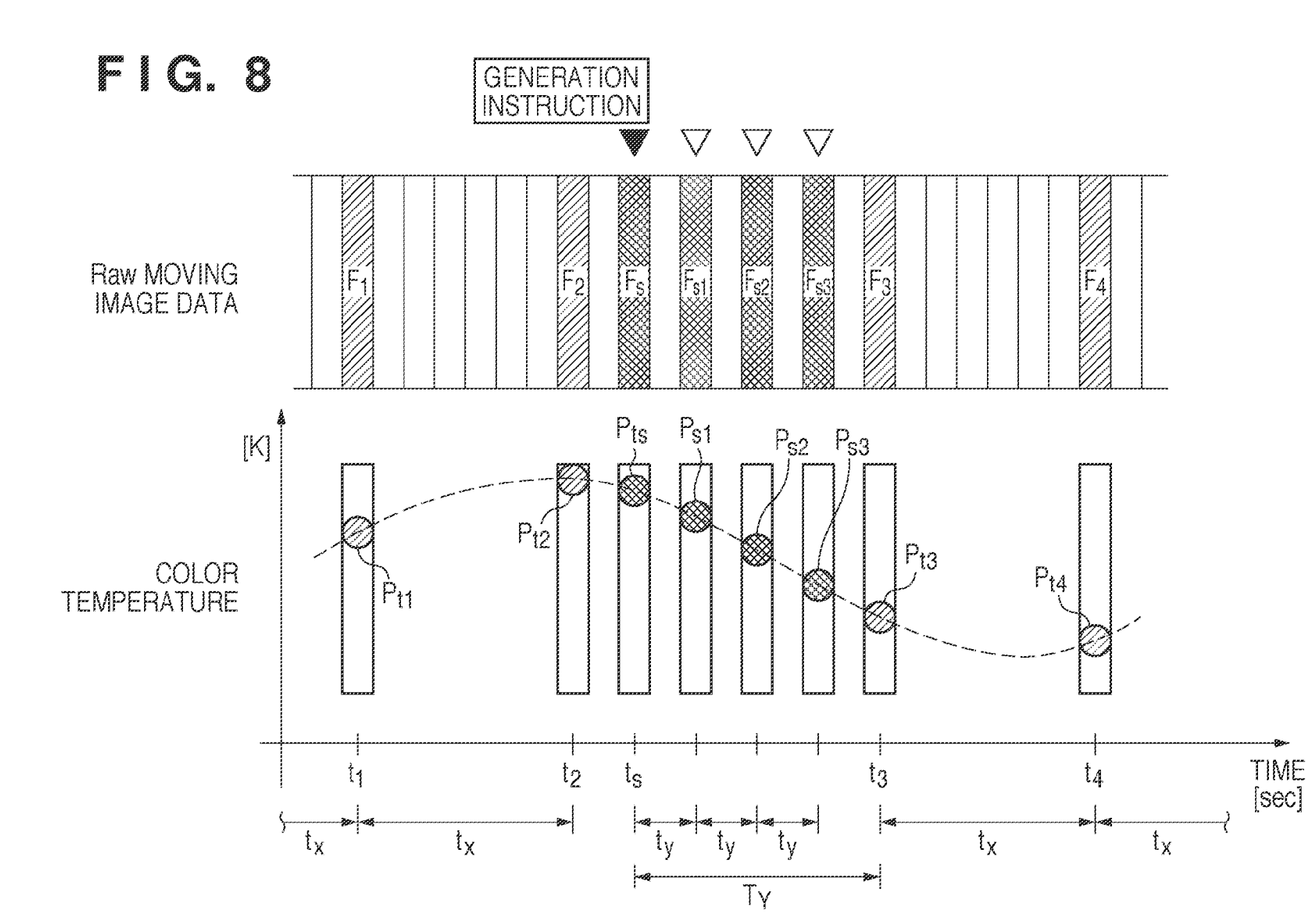
FIG. 8 is a view showing Raw moving image data recorded in the image capturing apparatus shown in FIG. 1.

In addition, as shown in FIG. 8, when development parameters are periodically recorded for Raw image frames appearing at predetermined frame intervals (6-frame intervals), the apparatus may record development parameters at short intervals (1-frame intervals) during a predetermined period from the issuance of an instruction (generation instruction) from the user. FIG. 8 is a view showing Raw moving image data to be recorded in the image capturing apparatus 100, in which Raw image frames constituting Raw moving image data and development parameters (color temperatures in this embodiment) are arranged along the time axis. As described above, the image capturing apparatus 100 automatically records, on the recording medium 112, the color temperatures $P_{t0}$ to $P_{t4}$ respectively corresponding to the Raw image frames $F_1$ to $F_4$, together with the Raw moving image data.

As shown in FIG. 8, when the user full-presses the still image capturing button at time $t_s$ corresponding to a scene of interest for the user after the color temperature $P_{t2}$ is automatically recorded, the image capturing apparatus 100 records (adds) the color temperature $P_{ts}$ for the Raw image frame $F_s$. The image capturing apparatus 100 also automatically records development parameters for Raw image frames at short intervals $t_y$ (for example, 1-frame intervals) until the lapse of a predetermined period $T_y$ since time $t_s$. In this case, $t_y<t_x$. As shown in FIG. 8, therefore, the apparatus records color temperatures $P_{s1}$, $P_{s2}$, and $P_{s3}$ for Raw image frames $F_{s1}$, $F_{s2}$, and $F_{s3}$, respectively, which exist in the predetermined period $T_y$. The image capturing apparatus 100 then records the color temperature $P_{t3}$ for the Raw image frame $F_3$ generated when the predetermined period $T_y$ has elapsed since time $t_s$ at which the user issued the generation instruction. Note that after recording the color temperature $P_{t3}$ for the Raw image frame $F_3$, the apparatus continues recording color temperatures (for example, the color temperature $P_{t4}$) for Raw image frames (for example, the Raw image frame $F_4$) appearing at predetermined frame intervals (6-frame intervals). Note that since the concrete operation of recording development parameters is the same as that described above, a detailed description of it will be omitted.

As has been described above, the image capturing apparatus 100 can obtain a target image without adjusting development parameters at the time of reproduction by recording development parameters for Raw image frames corresponding to scenes adjacent to a scene of interest at short intervals in accordance with an instruction from the user.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent application Nos. 2010-100360 filed on Apr. 23, 2010, and 2011-009201 filed on Jan. 19, 2011, which are hereby incorporated by reference herein in their entirety.

What is claimed is:

1. An image processing apparatus which records Raw moving image data constituted by a plurality of Raw image frames, the apparatus comprising:
   a generating unit configured to generate a development parameter corresponding to a Raw image frame;
   a recording unit configured to record, on a recording medium, the Raw moving image data and the development parameters generated by said generating unit for Raw image frames constituting the Raw moving image data;
   a designation unit configured to designate a specific Raw image frame from the plurality of Raw image frames in accordance with an instruction received from a user during image capture; and
   a control unit configured to control operation of said generating unit and operation of said recording unit,
   wherein said control unit controls said generating unit and said recording unit to record, on the recording medium, development parameters corresponding to Raw image frames extracted from the plurality of Raw image frames at predetermined frame intervals, together with the Raw moving image data, and controls said generating unit and said recording unit to record, on the recording medium, a development parameter corresponding to the specific Raw image frame designated by said designation unit, together with the Raw moving image data.

2. The apparatus according to claim 1, further comprising an imaging unit configured to generate the Raw moving image data and Raw still image data,
   wherein the instruction from the user is a generation instruction to generate the Raw still image data during generation of the Raw moving image data by said imaging unit.

3. The apparatus according to claim 2, wherein said designation unit designates, as the specific Raw image frame, one Raw image frame generated by said imaging unit when the generation instruction is issued.

4. The apparatus according to claim 3, wherein said control unit controls said generating unit and said recording unit to record, on the recording medium, development parameters corresponding to Raw image frames extracted at predetermined frame intervals from the one specific Raw image frame designated by said designation unit, together with the Raw moving image data.

5. The apparatus according to claim 3, wherein said control unit controls said generating unit and said recording unit to record, on the recording medium, development parameters corresponding to Raw image frames extracted at shorter intervals than the predetermined frame intervals in a predetermined period from the one specific Raw image frame designated by said designation unit, together with the Raw moving image data.

6. The apparatus according to claim 1, further comprising an imaging unit configured to generate the Raw moving image data and Raw still image data,
   wherein the instruction from the user is a preparation instruction to prepare for generation of the Raw still image data during generation of the Raw moving image data by said imaging unit, and
   said designation unit designates consecutive Raw image frames generated by said imaging unit during issuance of the preparation instruction as the specific Raw image frames.

7. The apparatus according to claim 6, wherein preparation for generation of the Raw still image data includes determining or changing an imaging condition for generation of the Raw still image data.

8. The apparatus according to claim 7, wherein said imaging unit includes a lens configured to change a focal length, and a stop mechanism configured to change an aperture value, and
   the imaging condition includes at least one of a focal length set for said lens and an aperture value set for said stop mechanism.

9. The apparatus according to claim 7, wherein said imaging unit includes a photoelectric conversion device configured to convert light from an object into an electrical signal, and an A/D conversion unit configured to amplify and convert the electrical signal into one of the Raw moving image data and the Raw still image data, and
   the imaging condition includes an amplification factor of the electrical signal which is set for said A/D conversion unit.

10. A control method for an image processing apparatus which records Raw moving image data constituted by a plurality of Raw image frames, the method comprising the steps of:
    generating a development parameter corresponding to a Raw image frame by a generating unit;
    recording, on a recording medium by a recording unit, the Raw moving image data and the development parameters generated in the generating step for Raw image frames included in the Raw moving image data;
    designating a specific Raw image frame from the plurality of Raw image frames by a designation unit in accordance with an instruction received from a user during image capture; and
    controlling the generating step and the recording step by a control unit,
    wherein in the controlling step, the generating step and the recording step are controlled to record, on the recording medium, development parameters corresponding to Raw image frames extracted from the plurality of Raw image frames at predetermined frame intervals, together with the Raw moving image data, and the generating step and the recording step are controlled to record, on the recording medium, a development parameter corresponding to the specific Raw image frame designated in the designating step, together with the Raw moving image data.

11. The method according to claim 10, wherein further comprising step of generating the Raw moving image data and Raw still image data,
    wherein the instruction from the user is a generation instruction to generate the Raw still image data during generation of the Raw moving image data.

12. The method according to claim 11, wherein in the designating step, one Raw image frame generated when the generation instruction is issued is designated as the specific Raw image frame.

13. The method according to claim 12, wherein in the controlling step, the generating step and the recording step are controlled so that development parameters corresponding to Raw image frames extracted at predetermined frame intervals from the one specific Raw image frame designated in the designating step are recorded on the recording medium together with the Raw moving image data.

14. The method according to claim 12, wherein in the controlling step, the generating step and the recording step are controlled so that development parameters corresponding to Raw image frames extracted at shorter intervals than the predetermined frame intervals in a predetermined period from the one specific Raw image frame designated in the designating step are recorded on the recording medium together with the Raw moving image data.

15. The method according to claim 10, wherein further comprising step of generating the Raw moving image data and Raw still image data, wherein the instruction from the user is a preparation instruction to prepare for generation of the Raw still image data during generation of the Raw moving image data, and wherein in the designating step, consecutive Raw image frames generated during issuance of the preparation instruction is designated as the specific Raw image frames.

16. The method according to claim 15, wherein preparation for generation of the Raw still image data includes determining or changing an imaging condition for generation of the Raw still image data.

17. The method according to claim 16, wherein the imaging condition includes at least one of a focal length set for a lens configured to change a focal length, and an aperture value set for a stop mechanism configured to change an aperture value.

18. The method according to claim 16, wherein the imaging condition includes an amplification factor of an electrical signal which is set for an A/D conversion unit configured to amplify and convert an electrical signal, generated from light from an object, into one of the Raw moving image data and the Raw still image data.

* * * * *